July 31, 1934.　　　　T. H. SHOPE　　　　1,968,321
PULLEY
Filed June 7, 1933
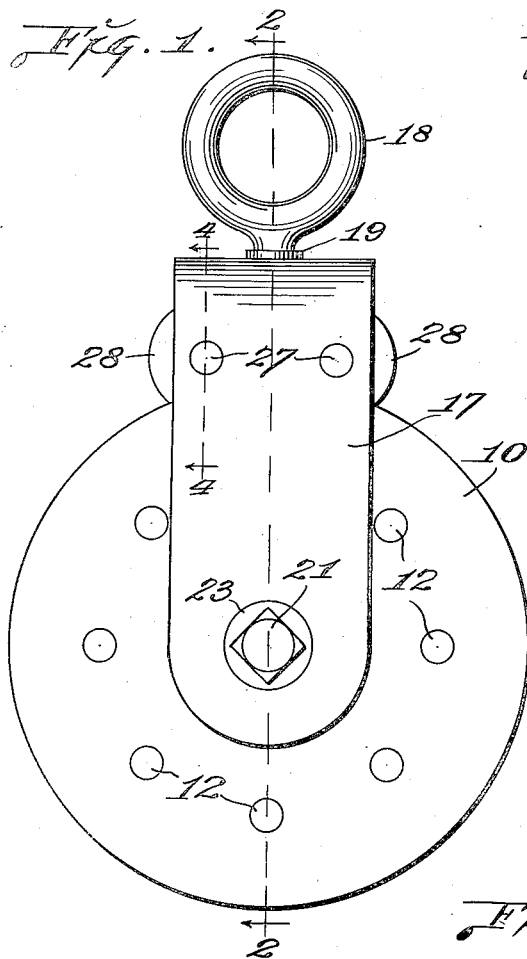
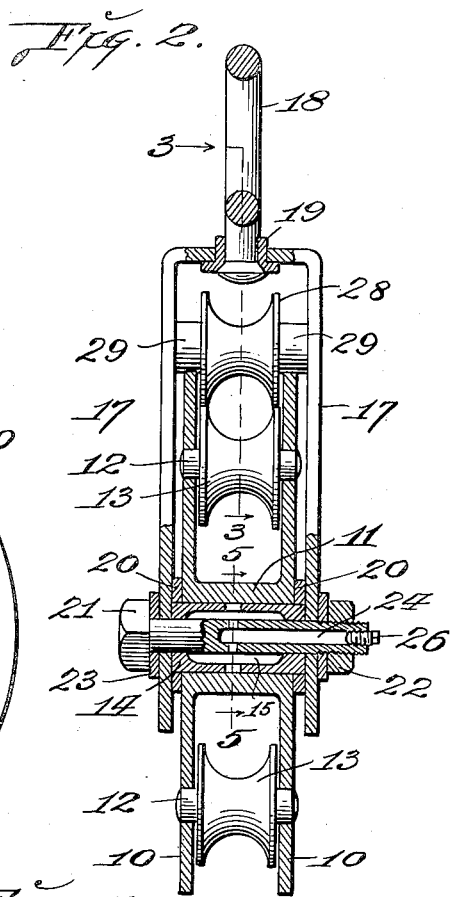
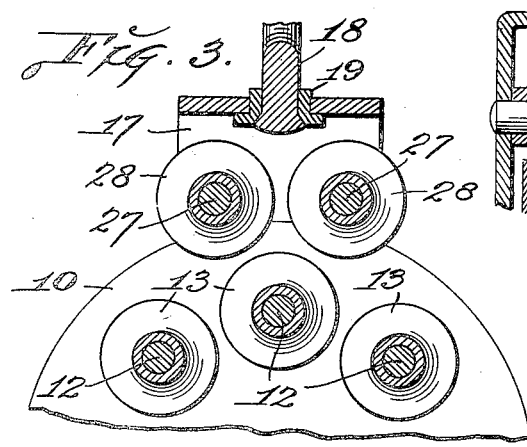
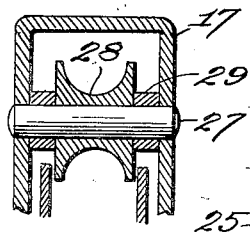
INVENTOR
THOMAS H. SHOPE.
BY Martin C. Smith ATTY.

Patented July 31, 1934

1,968,321

UNITED STATES PATENT OFFICE 1,968,321

PULLEY

Thomas H. Shope, Southgate, Calif.

Application June 7, 1933, Serial No. 674,701

6 Claims. (Cl. 254—192)

My invention relates to a pulley particularly designed for supporting cables, chains and hose or flexible tubes that serve as conduits for fluid under pressure and the principal objects of my invention are, to generally improve upon and simplify the construction of the existing forms of pulleys and to provide a pulley that will enable the supporting flexible member to travel over or around the pulley with the least possible development of friction.

Further objects of my invention are, to provide a pulley wherein a rotating carrier is provided adjacent to its periphery with a plurality of independently rotating small pulleys that receive the supported flexible member, further, to arrange in the upper portion of the frame or yoke of the pulley a plurality of small pulleys that are effective in retaining the flexible member in proper operative position upon the series of small pulleys that are carried by the main rotating frame and thereby counteracting backlash of the flexible member as it passes over the pulley and further, to provide simple and efficient means for lubricating the main bearing of the pulley.

With the foregoing and other objects in view, my invention consists in certain novel features of construction and arrangements of parts that will be hereinafter more fully described and claimed and illustrated in the accompanying drawing in which:

Fig. 1 is a side elevational view of the pulley constructed in accordance with my invention.

Fig. 2 is a vertical section taken on the line 2—2 of Fig. 1.

Fig. 3 is a vertical section taken on the line 3—3 of Fig. 2.

Fig. 4 is a detail section taken on the line 4—4 of Fig. 1.

Fig. 5 is a detail section taken on the line 5—5 of Fig. 2.

Referring by numerals to the accompanying drawing which illustrates a preferred embodiment of my invention, 10, 10 designate spaced disc-like walls that are connected at their centers by an integral tubular hub 11 and these walls and hub form the main rotating frame of the pulley.

Seated in the walls 10, between hub 11 and the edges of said walls, are the end portions of a circular row of pins or spindles 12 and mounted to rotate freely upon each spindle, is a small grooved pulley 13.

Extending through tubular hub 11, is a shaft or spindle 14, the ends of which project slightly beyond the outer faces of the plates 10 and formed in this shaft or spindle between its ends, is a chamber 15 for the reception of a suitable lubricant.

Formed through the wall of this shaft or spindle around the chamber therein, in a series of apertures 16.

The lower portions of the parallel legs of an inverted U-shaped yoke 17, bear directly against the ends of shaft or spindle 14 and the connected ends of the legs of this yoke occupy a position a short distance outwardly from the edges of the walls 10.

Swiveled to the connected end of yoke 17, is a ring or eye 18 and arranged between the swiveled end of said ring and the yoke, is a wear receiving collar 19.

In the event of excessive wear between the ring and yoke, the worn collar 19 may be removed and replaced by a new collar, thereby eliminating the necessity of replacement of the yoke or ring.

Mounted on the projecting ends of shaft or spindle 14 and interposed between the legs of the yoke and the outer faces of plates 10, are wear receiving washers 20.

The shank of a bolt 21 passes through suitably formed apertures in the legs of yoke 17 and through the shaft or spindle 14 and the threaded end of this bolt receives a nut 22. Washers 23 are located between nut 22 and the head of the bolt and the outer faces of the legs of yoke 17.

The threaded end of the shank of bolt 21 is provided with an axial bore 24 and formed in the body of the bolt and establishing communication between the inner portion of said bore 24 and the lubricant chamber 15, are apertures 25.

The outer end portion of the bore 24 is threaded for the reception of a screw plug 26. This plug when removed, permits lubricant to be delivered through bore 24 and apertures 25 into chamber 15 and any suitable means, for instance, a grease gun, may be utilized for forcing the lubricant into said chamber.

Plug 26, when seated in the end of the bolt, retains the inserted lubricant and the discharge of lubricant from chamber 15 through aperture 16 effectively lubricates the hub of the rotating frame.

Seated in the legs of yoke 17, adjacent to the connected ends of said legs and beyond the edges of the plates 10 of the rotary frame, are the ends of spindles 27 and mounted for rotation on each spindle in the same plane with the pulleys 13, are small grooved pulleys 28.

Arranged between the ends of these pulleys 28 and the legs of the yoke, and loosely mounted on the spindles 27, are spacing collars 29.

The flexible member that is supported by the pulley bears on the grooved pulleys 13 and said flexible member passes beneath the pulleys 28 that are carried by the yoke 17.

Thus the flexible member is always maintained in proper position upon the pulleys 13 and in the event that the flexible member is suddenly relieved of heavy pulling strains, the pulleys 28 prevent backlash of the flexible member and the destructive results thereof against the connected end of yoke 17.

The series of small pulleys 13 arranged in a circle between the walls 10 of the main rotating frame provide a practically continuous rolling support for the flexible member that is carried upon the pulley, thus materially reducing friction and providing a substantial free-running support for the chain cable or fluid pressure hose.

Obviously the yoke 17 may be made wider and the spindle 14 longer so as to accommodate two or more of the rotary frames carrying the pulleys 13, thus providing a multiple pulley, wherein the rotary frames are arranged side by side and have the same axis.

Such construction is especially applicable for the crown blocks and traveling blocks of well drilling rigs.

Thus it will be seen that I have provided a pulley that is relatively simple in construction, inexpensive of manufacture and very effective in performing the functions for which it is intended.

It will be understood that minor changes in the size, form, and construction of the various parts of my improved pulley may be made and substituted for those herein shown and described without departing from the spirit of the invention, the scope of which is set forth in the appended claims.

I claim as my invention:

1. In a pulley, a frame comprising a pair of spaced plates, a hub connecting the centers of said plates, a yoke in which said frame is mounted for rotation, a series of grooved pulleys mounted for independent rotation in said frame between the spaced plates thereof, which pulleys are arranged in a circle and a pair of grooved pulleys mounted for rotation in said yoke in the same plane with the pulleys that are carried by said frame.

2. In a pulley, a yoke, a spindle mounted in said yoke, a frame mounted for rotation on said spindle, a series of grooved pulleys mounted for rotation in said frame, said spindle having a lubricant chamber and lubricant outlet openings leading from said chamber and a bolt passing through said yoke and spindle.

3. A pulley as set forth in claim 2, said bolt having an axial bore and openings that establish communication between said bore and the lubricant chamber in said spindle.

4. A pulley as set forth in claim 2, said bolt having an axial bore, the inner end of which communicates with the lubricant chamber in said spindle and removable means for closing the outer end of said axial bore.

5. In a pulley, an inverted U-shaped yoke, a spindle mounted for rotary movement between the ends of the legs of said yoke, a frame mounted for rotary movement on said spindle, said frame comprising a pair of spaced circular plates and a hub, a series of grooved pulleys mounted for independent rotation in said frame between said spaced plates, which pulleys are arranged in a circle and a plurality of grooved pulleys mounted for rotation in said yoke in the same plane with the pulleys that are carried by said frame.

6. In a pulley, an inverted U-shaped yoke, a bolt passing through the ends of the legs of said yoke, a spindle mounted for rotary movement on said bolt between the legs of the yoke, said bolt and spindle having communicating lubricating chambers, a frame mounted for rotary movement on said spindle, said frame comprising a pair of spaced plates and a hub that surrounds the spindle, a plurality of grooved pulleys mounted for independent rotation between the spaced plates of said frame, which pulleys are arranged in a circle and a plurality of grooved pulleys mounted for rotation in the yoke in the same plane with the pulleys that are carried by said frame.

THOMAS H. SHOPE.